United States Patent [19]

Dillon

[11] Patent Number: 4,633,163
[45] Date of Patent: Dec. 30, 1986

[54] MID-VALUE CIRCUIT AND CONTROL SYSTEM

[75] Inventor: Edward J. Dillon, Roanoke, Va.

[73] Assignee: General Electric Company, Salem, Va.

[21] Appl. No.: 660,779

[22] Filed: Oct. 15, 1984

[51] Int. Cl.$^4$ .................................................. G05F 1/44
[52] U.S. Cl. .................................... 323/277; 323/275; 323/280; 323/367; 219/499
[58] Field of Search ............... 323/275, 276, 277, 280, 323/278, 279, 273, 274, 281, 365, 367; 219/499, 497

[56] References Cited

U.S. PATENT DOCUMENTS

| | | |
|---|---|---|
| 3,383,585 | 5/1968 | Gately .................................. 323/277 |
| 3,678,370 | 7/1972 | Gately .................................. 323/275 |
| 3,918,636 | 11/1975 | Dawson ........................... 219/499 X |

Primary Examiner—Philip H. Leung
Attorney, Agent, or Firm—Arnold E. Renner

[57] ABSTRACT

A control system for regulating a system parameter includes three sensing elements to independently sense a single system parameter and provide respective feedback signals. Three substantially identical controllers are responsive to these feedback signals with the controllers each having a bridge network of three resistors and being connected to a common resistor. In response to the feedback signals and signals representative of the imbalance in the bridge networks, the controllers act to cause bridge balance by collectively supplying current to the common resistor to effect a balance and to thus control the system parameter in accordance with the middle valued of the three feedback signals.

15 Claims, 3 Drawing Figures

MID-VALUE CIRCUIT AND CONTROL SYSTEM

BACKGROUND OF THE INVENTION

The present invention relates generally to control circuits and more particularly to a control circuit for supplying a load with electrical power proportional to the middle valued of three input signals.

In the discipline of process control, it is often desirable to develop an output signal (e.g., a control signal) which represents the middle valued of three input signals. These input signals are commonly feedback signals of a system parameter which is being controlled with the three feedback signals being the result of independent sensing of the same parameter. For example, a parameter closely monitored in a gas turbine is the internal temperature of the combustion chamber. Because of the criticality of this measurement, since excessive temperature or excessive rate of temperature rise can be extremely detrimental to the turbine, it is common to use a plurality of sensors. These sensors provide independent feedback signals which, although the sensors are of the same type, vary due to variances in the sensors themselves, differences in the amount of degradation of the sensors and the circuitry involved and/or other factors such as one of the sensors may fail. It is, therefore, commonly known to consider these sensors in groups of three and to select the sensor providing the middle value of the three as being the "most correct" and to regulate the temperature to that value. In a gas turbine, temperature is largely regulated by controlling the fuel flow to the mid-value.

A variety of mid-value circuits are known. Most of these circuits are either very expensive or have a common active component(s) the failure of which will result in a complete loss of the system. As an example, it is known to have an operational amplifier as the common point with the circuitry associated with the individual feedbacks all feeding the common operational amplifier. It is apparent in this case that should this amplifier fail, the control system will either fail or at least be seriously degraded.

SUMMARY OF THE INVENTION

It is, therefore, an object of the present invention to provide a new and improved mid-value circuit.

It is another object to provide a reliable mid-value circuit which employs only passive elements at its point of commonality.

It is a further object to provide a mid-value circuit employing a passive element at its point of commonality and which allows for failure of one portion while still providing a valid output.

It is an additional object to provide a system for the control of a single parameter employing plural feedbacks supplied to an improved mid-value circuit.

The foregoing and other objects are achieved, in accordance with the present invention, by providing a mid-value circuit for developing an output signal to be applied to a load which output signal is proportional to the middle in a value of first, second and third input signals. This circuit includes three resistive bridge circuits, of substantially identical configuration, each of which includes, as one leg, a common resistive element. Each of the bridge circuits is capable of furnishing electrical current to the load. First, second and third control means, associated respectively with each of the bridge circuits control the amount of current that its respective bridge circuit supplies to the load. Each control means comprises a circuit which is responsive to an electrical condition of the load to develop a signal proportional thereto. By comparing this signal with a signal representative of one of the input signals, and combining the result of this comparison with a signal which is proportional to the electrical imbalance of its respective bridge, there is provided a control signal which determines the amount of current that bridge furnishes to the load. Since each of the three circuits senses the same load condition and reacts to the amount of bridge imbalance, the result is a control based upon the middle valued (mid-value) of the three input signals.

Employing the invention as a process control, the load is the means to utilize the final output of the mid-value circuit and the plural feedbacks are representations of individual sensings of a single parameter to be controlled, for example, temperature, voltage, current, etc.

BRIEF DESCRIPTION OF THE DRAWING

While the present invention is described in particularity in the claims annexed to and forming a part of this specification, a better understanding thereof can be had by reference to the following description taken in conjunction with the attached drawing in which:

DETAILED DESCRIPTION

Figure 1:
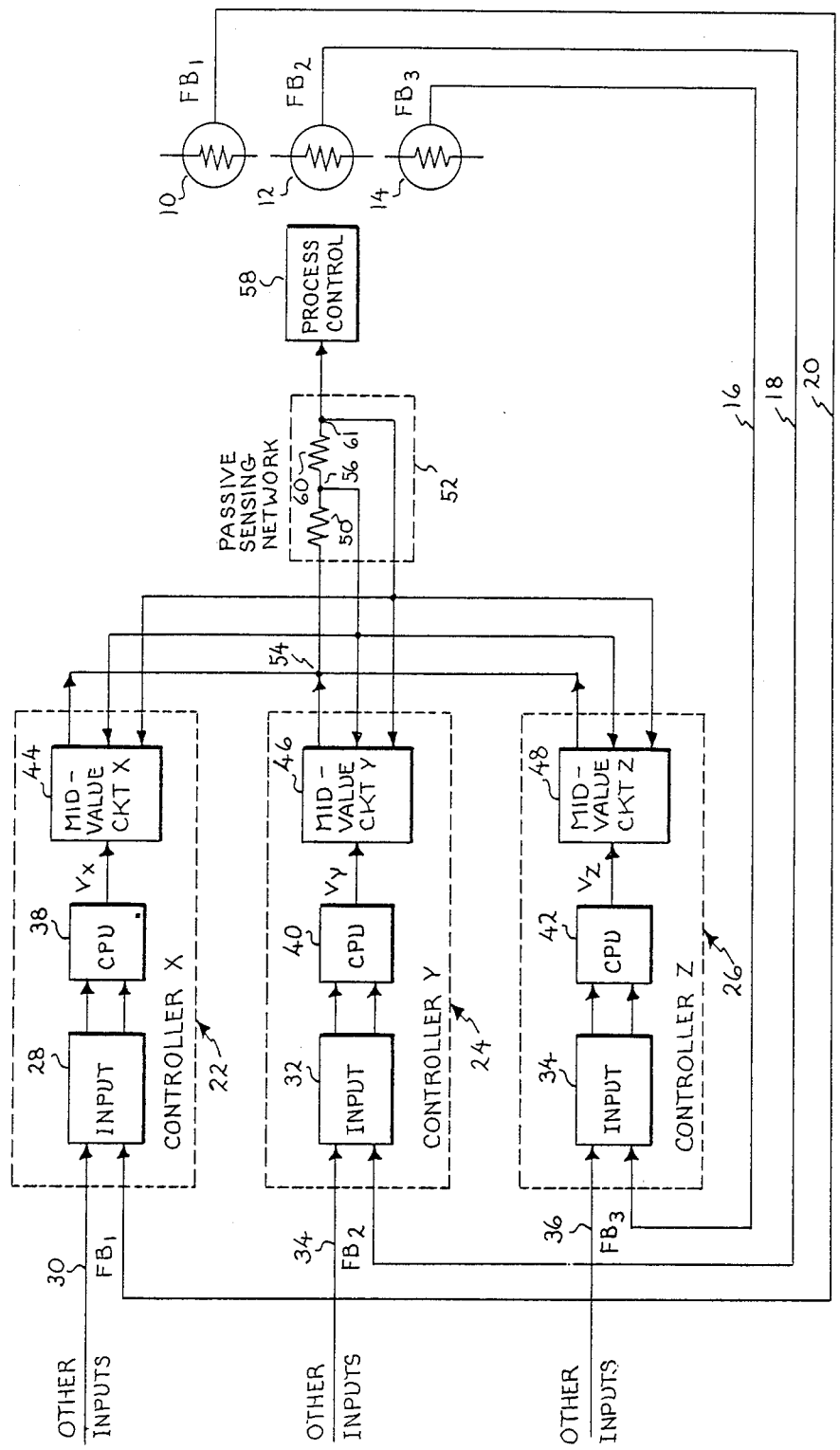
FIG. 1 is a high level block diagram of the control system of the present invention and further illustrating one possible environment for use of the present invention.

Reference is now made to FIG. 1 which shows a high level block diagram of a control system of the present invention further including one possible environmental implementation thereof. As shown in FIG. 1, three sensors, 10, 12 and 14, located external to the circuitry of the present invention, provide feedback signals $FB_1$, $FB_2$ and $FB_3$ on lines 20, 18 and 16, respectively. These feedback signals typically represent the same operating parameter. As an example, this operating parameter might be the internal temperature of the combustion chamber of a gas turbine. As such, the feedback signals on lines 16, 18 and 20 may be of the same value or they may differ due to variances in the sensors, associated circuitry, etc. The three feedback signals are applied, respectively, to three identical controllers 22, 24 and 26, also designated controller X, controller Y and controller Z. Each of the controllers includes an input section which receives a respective feedback signal as well as other input signals which are not pertinent to the present invention and are included here only for purposes of illustrative completeness. Thus, controller 22 includes input section 28 which receives the feedback signal $FB_1$ and other inputs via line 30. In a similar manner, controller 24 has an input section 32 which receives the $FB_2$ signal and other inputs via line 34 and controller 26 has input section 34 which receives the feedback signal $FB_3$ and other inputs on line 36. Each of the controllers is also shown as including a central processing unit (CPU). CPUs 38, 40 and 42 of controllers 22, 24 and 26, respectively, receive signals from their respective input sections and perform apppropriate computations to provide, insofar as the present invention is concerned, respective outputs $V_X$, $V_Y$ and $V_Z$ (scaled or adjusted feedback signals representing the feedback signal $FB_1$, $FB_2$ and $FB_3$) for application to the mid-value circuits of the present invention. Thus, it is shown in FIG. 1 that the $V_X$ signal is applied to the mid-value circuit 44 of controller 22 while the $V_Y$ signal is applied to a similar circuit 46 of controller 24. The $V_Z$ signal is applied to mid-value circuit 48 of controller 26.

Figure 2:
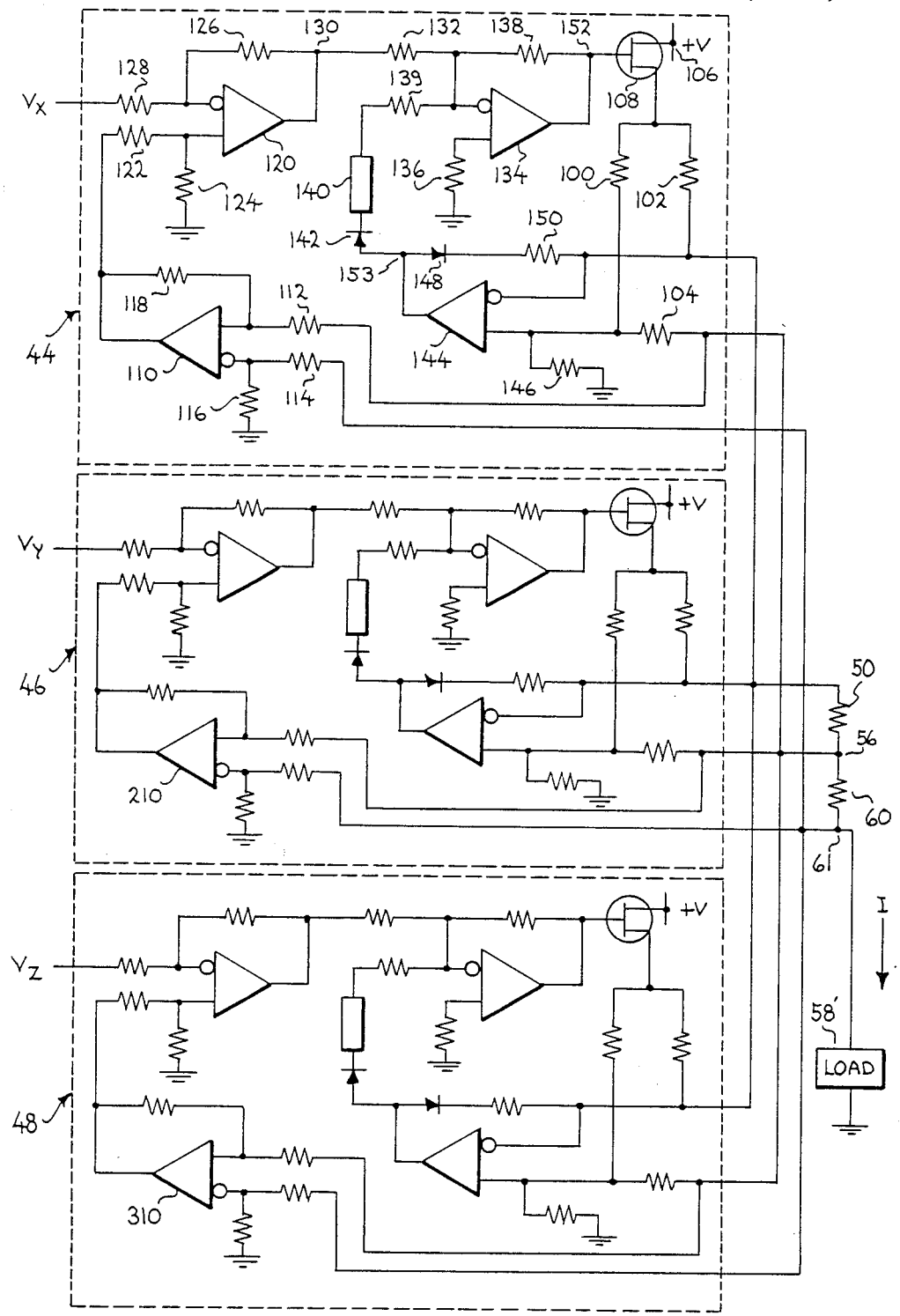
FIG. 2 is a schematic diagram of the mid-value circuit of the present invention in accordance with a preferred embodiment; and, FIG. 3 is a schematic diagram of a portion of the mid-value circuit illustrating an alternative embodiment of the present invention.

It is recognized that it is not technically correct to state that the mid-value circuits 44, 46 and 48 are totally enclosed within the boxes as indicated since, as will be better understood with respect to FIG. 2, a resistor 50, shown included within a passive sensing network 52 external to the circuits, forms a common part of each circuit. In this respect, an output is shown from each of the mid-value circuits 44, 46 and 48 to a node 54 which is connected to one end of the common resistor 50. The other end of resistor 50, at node 56, is connected to a second resistor 60, the other end of which (at node 61) is connected to a process control 58. In accordance with the present invention, control 58 serves to control the parameter being sensed by the sensors 10, 12 and 14. The voltage across the second resistor 60 is applied as a signal to each of the mid-value sensing circuits 44, 46 and 48. Basically, what is provided by the circuitry of FIG. 1 is that the signals representing the parameter sensed by the three sensors 10, 12 and 14 are supplied as feedback signals to the controllers to develop three input signals to the mid-value circuits 44, 46 and 48 (which actually include as a portion thereof the resistor 50). An output of the mid-value circuits at node 56 is applied by way of a sensing resistor 60 to the process control 58 to thus control the process. The mid-value circuits serve to control the process in accordance with the value of the three input signals $V_X$, $V_Y$ and $V_Z$ (i.e., representative feedback signs $FB_1$, $FB_2$ and $FB_3$) accordingly to the one having the middle value. It will be noted that in FIG. 1 the load condition being sensed; i.e., the parameter which is furnished to the process control 58, is the current supplied thereto. This is done, as illustrated by using, as a feedback signal, the voltage across resistor 60 (nodes 56 and 61) which is proportional to the current through that resistor. This current is the combined output of the three mid-value circuits.

Reference is now made to FIG. 2 which is a detailed schematic diagram of the mid-value circuitry of the present invention. Shown in FIG. 2, within dashed line blocks, are the three circuit portions 44, 46 and 48 which in FIG. 1 are labeled mid-value circuits X, Y and Z respectively. Also shown are the two external resistors 50 and 60 as well as a load labeled 58'. The latter corresponds to the process control 58 of FIG. 1. As will become apparent as this description precedes and as was earlier indicated, resistor 50 actually forms a portion of the mid-value circuits but is shown externally to the dashed line depiction because it is common to all three of those circuits. Looking now specifically to FIG. 2, only that circuit within dashed line block 44 and its relationship to elements 50, 56, 60, 61 and 58' will be described in detail since the composition and operation of the three circuits 44, 46 and 48 are identical and thus repetitious description is believed unnecessary.

It is seen first that a resistive bridge network comprised of resistors 100, 102, 104 and 50 is supplied with electrical power from a source of electrical energy ($V+$) applied at terminal 106. The amount of current applied to this bridge circuit is controlled by suitable means such as the field effect transistor (FET) 108. Depending upon the degree of conduction by FET 108, current flows through the resistive bridge and the output of this bridge, at node 56, is applied to a resistor 60 in series connection with load 58'.

The voltage across resistor 60 (nodes 56 and 61) is applied to the two inputs of a differential amplifying network. Node 56 is connected to the non-inverting input of an operational amplifier 110 by way of a resistor 112 while node 61 is connected to the inverting input of operational amplifier 110 by way of an input resistor 114. The inverting input is further connected to ground by way of resistor 116 and a feedback resistor 118 is connected between the output and the non-inverting input of the operational amplifier 110 such that, as is well known in the art, a differential amplifier is provided. The output of the amplifier 110 is a condition signal proportional to the voltage across resistor 60. This signal is representative of a load condition which, in this case, is load current (I).

The output of amplifier 110 is applied via resistor 122 to the non-inverting input of an operational amplifier 120 of a second differential amplifying network. This non-inverting input is further connected to ground by way of a resistor 124. The output of amplifier 120 is connected to its inverting input by way of resistor 126 and has further applied thereto, by way of resistor 128, the $V_X$ signal. The $V_X$ signal, as described with respect to FIG. 1, is the signal which is proportional to the apparent desired value according with the feedback signal applied to controller 22, feedback signal $FB_1$. Thus, the output of operational amplifier 120 which appears at node 130 is an error signal which is proportional to the difference between the apparent desired level of operation as represented by the signal $V_X$ and the condition signal of the load.

The error signal at node 130 is applied via resistor 132 to the inverting input of an amplifier 134 which is connected in the summing mode. The non-inverting input of amplifier 134 is connected via resistor 136 to ground and its output is connected to its inverting input by way of a resistor 138. A second input to the inverting input of operational amplifier 134 is by way of a series connection of a resistor 139, a delay means 140, and a diode 142 from the output of an additional operational amplifier 144. The non-inverting input of amplifier 144 is connected via resistor 146 to ground and to the junction of bridge resistors 102 and 104. Its output is connected to its inverting input by way of a series combination of a diode 148 and a resistor 150 such that there is provided a positive feedback thereto which tends to cause the amplifier output to go to zero. The inverting input of amplifier 144 is connected to the junction point of bridge resistors 102 and 50. Thus, the output of amplifier 144 (referred to as a bridge amplifier) at node 153 will be a signal proportional to the imbalance of the bridge. This signal, as was earlier indicated, is applied by way of diode 142, delay means 140 and resistor 139 to the inverting input of the summing amplifier 134. The purpose of the delay is merely to prevent race conditions.

The output of the operational amplifier 134 at node 152 is a control signal which is applied to the gate electrode of the FET 108, the drain electrode of which is connected to the positive potential $V+$ at terminal 106. The source electrode of FET 108 is connected to the bridge circuit at the junction point of resistors 100 and 102. The control signal at node 152, proportional to the sum of the error signal at node 130 and the bridge imbalance signal at node 153, controls the current supplied through the resistor bridge (resistors 100, 102, 104 and 50) and hence the amount of current I furnished to load 58' through resistor 60.

The other two mid-value circuits 46 and 48 are, as was earlier stated, identical to circuit 44 and will not be described in detail here. The connections and operations of these circuits being essentially identical to that described with each contributing to total load current in accordance with the relationship among the input signals ($V_X$, $V_Y$ and $V_Z$) and the value of the voltage across resistor 60.

With the foregoing in mind, the following will explain the operation of the mid-value circuit of the present invention. For purposes of this description, it will be assumed that the $V_X$ signal has the highest value and that the $V_Z$ signal has the lowest value. The $V_Y$ signal has a value intermediate $V_X$ and $V_Z$. This selection is entirely arbitrary as each of the circuits is identical and it will be used merely for purpose of illustration. The overall operation of the system is the same regardless of the order values of the input signals. With $V_X$ being the highest signal, amplifier 120 will sense that the condition signal from amplifier 110 is less than $V_X$ value and thus will generate a negative going signal to the input of the summing amplifier 134. Amplifier 134 will, in turn, provide a control signal output to the gate of FET 108 turning that device on to a high degree such that the bridge network of circuit 44 attempts to dominate the load current. That is, the current through the bridge network 100, 102, 104 and 50 will be at a high level. (At this point the relative values of the resistors of the bridges becomes important. As a typical example, if resistor 102 has a value of R, resistors 100 and 104 would be ten times that value or 10R. Resistor 50 would be one-half of that value of R/2.) With the FET 108 full on, the upper bridge network will attempt to supply total load current resulting in a heavy imbalance of the bridge network by virtue of the differential resistive value of resistors 102 and 50. This imbalance will, in turn, cause a large output signal from the bridge amplifier 144. This output signal (positive) is applied to summing amplifier 134 and will tend to cause this latter amplifier to decrease its output and to thus reduce the current supplied to the bridge and hence the load. This decrease in current will continue until it reaches a value corresponding to the middle valued input signal, signal $V_Y$ in the present example. As soon as this occurs, the circuit 46 which has the middle value will sense that its condition output from the amplifier corresponding to 110 (amplifier 210) is less than that required by its input signal $V_Y$ and will begin to supply current through its bridge circuit including common resistor 50 to the load. These two circuits with the high and the middle value input signals ($V_X$ and $V_Y$) will then stabilize at the middle value with each providing one-half of the load current to resistor 50 at which time these bridges will be in a balanced state.

The circuit with the low value input which in the present illustration is circuit 48 does not supply current. Since it has the lowest input value, the result of the comparison of its input signal $V_Z$ with its condition signal from amplifier 310 will result in no current through its bridge network. Thus, it is seen that even if the signal $V_Z$ were to go to zero, indicating a complete fault or failure of this circuit or an input thereto, the other two circuits would consider that as the low value and stabilize on the lower of the remaining two values. This adds both consistency and reliability to the overall system.

Figure 3:
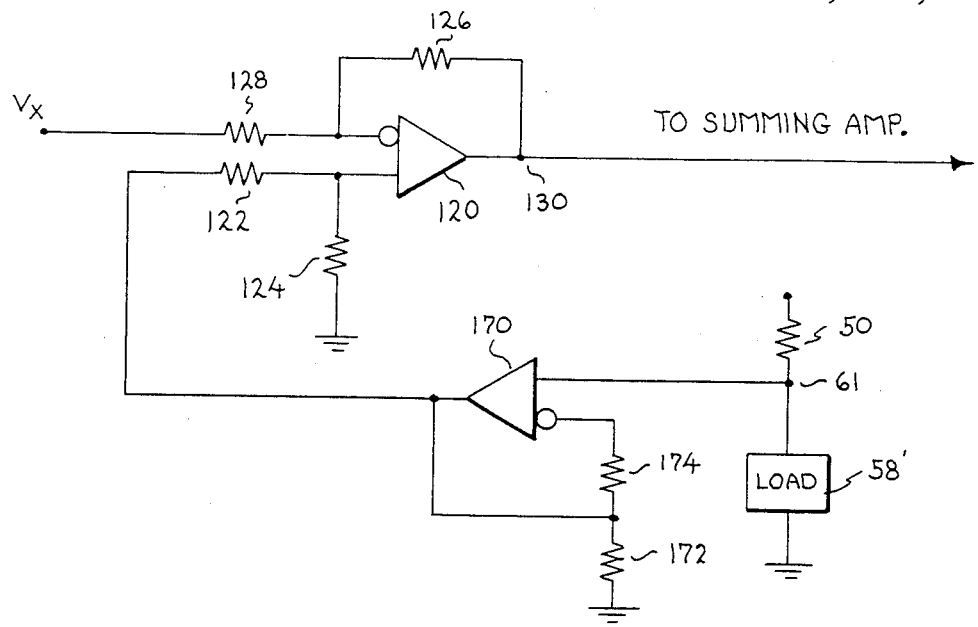

FIG. 3 illustrates one possible modification of the present invention in which the load voltage rather than load current is employed as the load condition to be monitored. FIG. 3 shows for orientation purposes, the common resistor 50, node 61, load 58' and the differential amplifier 120 and its associated circuitry. The difference here is that rather than sensing the load current as by the amplifier 110 and its related circuitry, the voltage at node 61 (the voltage of the load with respect to ground) is supplied to the non-inverting input of a simple gain operational amplifier 170. The inverting input of that operational amplifier is connected to ground by way of series connected resistors 174 and 172 with the junction of those resistors being connected to the amplifier output. The output of amplifier 170, which forms the system condition signal serves as the input, via resistor 122, to differential amplifier 120 and in all other respects the operational circuit is identical to that earlier described. It is, of course, to be realized that similar circuits would be utilized in each of the three mid-value circuits 44, 46 and 48 such that once again they are identical in format and operation. In all other respects these circuits remain the same.

While there have been shown and described what are at present considered to be the preferred embodiments of the invention, modifications thereto will readily occur to those skilled in the art. It is not desired, therefore, that the present invention be limited to the specific embodiments as shown and discussed and it is intended to cover within the appended claims all such modifications as fall within the true spirit and scope of the invention.

What is claimed:

1. Circuitry for developing an output signal for application to a load which output signal is proportional to the middle valued of three input signals comprising:
    (a) three resistive bridge networks each having a common resistor included as one leg thereof;
    (b) means to selectively supply electrical current to each of said bridge networks whereby current exists in said common resistor and whereby there is produced said output signal for said load;
    (c) means to connect said bridge networks to said load for the application of said output signal to said load;
    (d) means to develop a condition signal representing the value of an electrical condition associated with said output signal; and,
    (e) individual control means associated with each of said bridge networks for controlling the electrical current supplied to its associated bridge network, said control means comprising;
        (1) means responsive to said condition signal and to a respective one of said input signals to develop an error signal representative of the difference therebetween,
        (2) means connected to the associated bridge network for providing an imbalance signal representative of the amount of voltage imbalance of that bridge network,
        (3) summing means for combining said error signal and said imbalance signal to yield a control signal, and, (4) means responsive to said control signal for controlling the electrical current supplied to said bridge network.

2. The invention in accordance with claim 1 wherein said means to develop said condition signal includes means to develop a signal proportional to the current supplied to said load.

3. The invention in accordance with claim 1 wherein said condition signal is a signal proportional to current supplied to said load and wherein said means to develop said condition signal includes a sensing resistor connected in series with said bridge networks and said load and means responsive to the voltage developed across said sensing resistor for producing said condition signal.

4. The invention in accordance with claim 3 wherein said means responsive to the voltage developed across said sensing resistor comprises a differential amplifier.

5. The invention in accordance with claim 1 wherein said means to develop said condition signal includes means to develop a signal proportional to the voltage across the load.

6. The invention in accordance with claim 5 wherein said means to develop a signal proportional to the voltage across the load comprises a gain amplifier circuit.

7. The invention in accordance with claim 1 wherein said means connected across said bridge network for providing an imbalance signal comprises a bridge amplifier circuit including feedback circuitry tending to drive the output thereof to zero.

8. A mid-value circuit for furnishing an output signal to a load which output signal is proportional to the middle valued of first, second and third input signals comprising:
(a) first, second and third resistive bridge networks of substantially identical configuration, each including, as one leg thereof, a common resistive element, each of said bridge networks being capable of furnishing electrical current to the load;
(b) first, second and third controllable means associated, respectively, with each said bridge network for controlling the amount of current the respective bridge network supplies to the load, said controllable means each comprising:
 (1) means responsive to an electrical condition of the load to develop a condition signal proportional to said electrical condition,
 (2) comparator means responsive to said condition signal and to a respective one of said input signals to provide a difference signal proportional to the difference therebetween,
 (3) means connected to said bridge network to generate an imbalance signal proportional to the degree of electrical imbalance of a respective bridge network,
 (4) summing means responsive to said imbalance and condition signals to develop a control signal, and
 (5) means responsive to said control signal to govern the amount of current the respective bridge network delivers to the load, the sum of the currents of said first, second and third bridge networks constituting said output signal.

9. The invention in accordance with claim 8 wherein the electrical condition is load current.

10. The invention in accordance with claim 8 further including a resistor in series connection with each of said bridge networks and the load, wherein the electrical condition is the current supplied to the load and wherein the condition signal is developed utilizing means to sense the voltage being developed across said resistor in series connection.

11. The invention in accordance with claim 8 wherein the electrical condition is the voltage across the load.

12. The invention in accordance with claim 8 wherein said means to develop said condition signal includes a gain circuit responsive to the voltage across the load.

13. A control for regulating a system parameter comprising:
(a) first, second and third sensors to independently sense a single system parameter and to provide respective first, second and third feedback signals representative of said parameter;
(b) a first resistive element connected in series relationship with a load serving to control said system parameter;
(c) first, second and third substantially identical controllers respectively responsive to said first, second and third feedback signals to collectively generate a parameter control signal for application to the load for the control of said system parameter, said parameter control signal being developed in accordance with that feedback signal whose value is intermediate the value of the other two feedback signals, each said controllers including:
 (1) three legs of a resistive bridge and commonly employing said first resistive element as the fourth leg of said bridge,
 (2) means to derive a condition signal as a function of the parameter control signal, and
 (3) circuit means responsive to a respective feedback signal and to said condition signal to generate said parameter control signal.

14. The invention in accordance with claim 13 further including an additional resistive element in series connection with said first resistive element, wherein said condition signal is derived as a function of the current through said additional resistive element.

15. The invention in accordance with claim 13 wherein said condition signal is derived as a function of the voltage across the load.

* * * * *